United States Patent [19]

Yeh

[11] Patent Number: 5,215,063
[45] Date of Patent: Jun. 1, 1993

[54] MOTOR VEHICLE AIR-FUEL RATIO AUTOMATIC CONTROL DEVICE

[75] Inventor: Jin Y. Yeh, Taipei, Taiwan

[73] Assignee: Haw Mei Engineering Enterprise Co., Ltd., Taipei, Taiwan

[21] Appl. No.: 903,751

[22] Filed: Jun. 25, 1992

[51] Int. Cl.⁵ .............................................. F02B 3/00
[52] U.S. Cl. .................................................... 123/531
[58] Field of Search ........................ 123/531, 533, 535

[56] References Cited

U.S. PATENT DOCUMENTS

| | | | |
|---|---|---|---|
| 4,376,423 | 3/1983 | Knapstein | 123/533 |
| 4,387,696 | 6/1983 | Yogo et al. | 123/533 |
| 4,556,037 | 12/1985 | Wisdom | 123/531 |

Primary Examiner—Noah P. Kamen
Attorney, Agent, or Firm—Bacon & Thomas

[57] ABSTRACT

A motor vehicle air-fuel ratio automatic control device comprises an electromagnetic valve electrically connected to the generator of a motor vehicle to control the passageway of an air loop to the fuel pipe of the motor vehicle. Starting the engine of the motor vehicle causes the electromagnetic valve to open the passageway to supply additional air to the fuel pipe so as to increase the proportion of air in the air-fuel ratio. Stopping the engine of the motor vehicle causes the electromagnetic valve to be electrically disconnected so that the passageway is closed whereby the proportion of air in the air-fuel ratio is reduced to enable a subsequent easy starting of the engine.

2 Claims, 3 Drawing Sheets

MOTOR VEHICLE AIR-FUEL RATIO AUTOMATIC CONTROL DEVICE

BACKGROUND OF THE INVENTION

The present invention relates to a motor vehicle air-fuel ratio automatic control device which automatically controls the proportion of air of the air-fuel ratio to provide for easy starting of the engine without increasing engine exhaust pollution.

In the combustion system of a motor vehicle, the air-fuel ratio is generally controlled at 1:8 or 1:7 for easy starting of the engine. After start-up, the air-fuel ratio is adjusted within the range of 1:14 to 1:17 so that better combustion efficiency can be achieved. Several cold starting fuel supply auxiliary systems are known and used in controlling the air-fuel ratio of the combustion system of a motor vehicle. However, if the proportion of fuel in the air-fuel ratio is excessively increased, the engine of a motor vehicle may be stopped easily. Once stopped, the engine is difficult to start again. Although increasing the proportion of fuel in the air-fuel ratio makes cold starting easy, it simultaneously increases the consumption of fuel and produces additional exhaust pollutants.

SUMMARY OF THE INVENTION

The present invention provides a motor vehicle air-fuel ratio automatic control device which automatically increases the proportion of air in the air-fuel ratio after the engine has been started so as to reduce fuel consumption and exhaust pollution, and which automatically reduces the proportion of air in the air-fuel ratio after stopping the engine so as to enable the engine to be easily started again.

DETAILED DESCRIPTION OF THE PREFERRED EMBODIMENT

Referring to the annexed drawings in detail, the preferred embodiment of the present invention is generally comprised of an electromagnetic valve connected to the generator of a motor vehicle to control air intake volume, and a hollow screw member connected to the electromagnetic valve as will be discussed in detail below.

Figure 1:
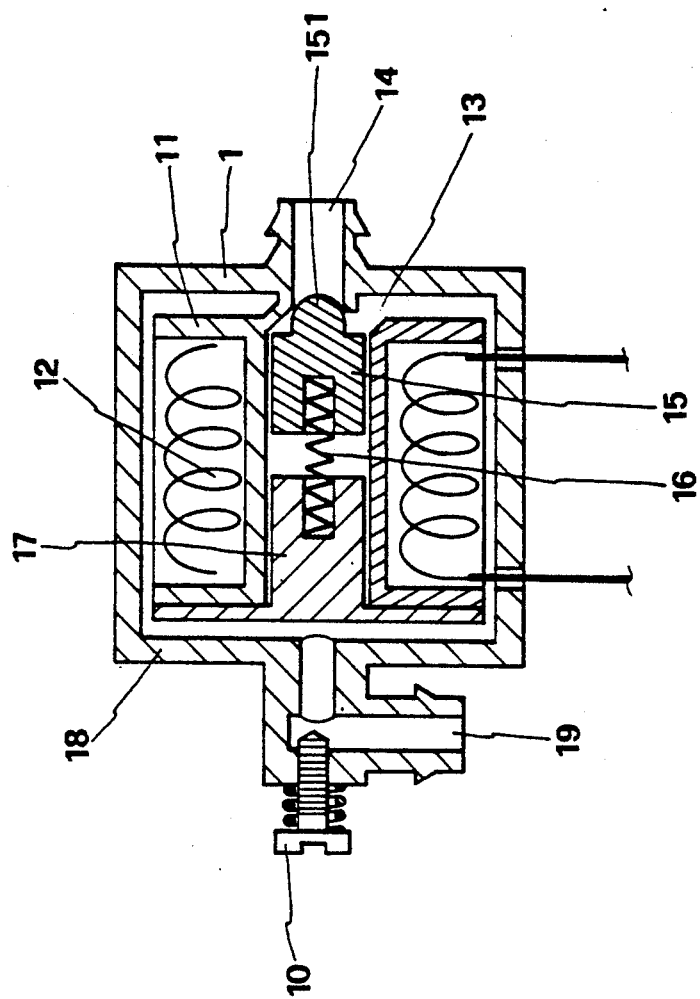
FIG. 1 is a cross section of an electromagnetic valve according to the present invention.

Referring to FIG. 1, the electromagnetic valve 1 is comprised of an inside coil holder 11 adapted to hold a coil 12, an air passage hole 13 at one side, an air outlet hole 14 in fluid communication with the air passage hole 12 at a right angle, a valve 15 located in a central space thereof and adapted to seal the air outlet hole 14, an axle 17 spaced from the valve 15, and a spring 16 supported between the valve 15 and the axle 17. The valve 15 comprises a front projection 151 adapted to extend into the air outlet hole 14 to seal the air outlet hole 14. When electrically connected, the axle 17 can be energized to attract the valve 15 causing the air outlet hole 14 to be opened. When electrically disconnected, the valve 15 is released from the axle 17 and pushed back by the spring 16 to again block the air outlet hole 14. The valve 1 is enclosed by an outer shell 18 which has an air intake port 19 controlled by an adjusting screw 10. Intake flow of air is guided into the electromagnetic valve 1 through the air intake port 19 and exhausted through the air outlet hole 14 via the air passage hole 13. In order to provide power supply to the electromagnetic valve 1, two electric wires are used, i.e., one for connecting the coil 12 of the electromagnetic valve 1 to a motor vehicle's generator and the other for grounding the valve, preferably to the metal body of the motor vehicle.

Figure 2:
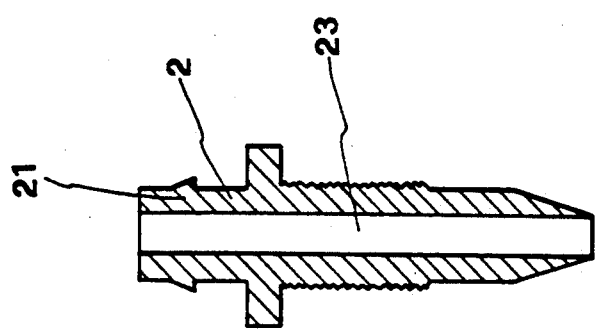
FIG. 2 is a cross section of a hollow screw according to the present invention.
Figure 3:
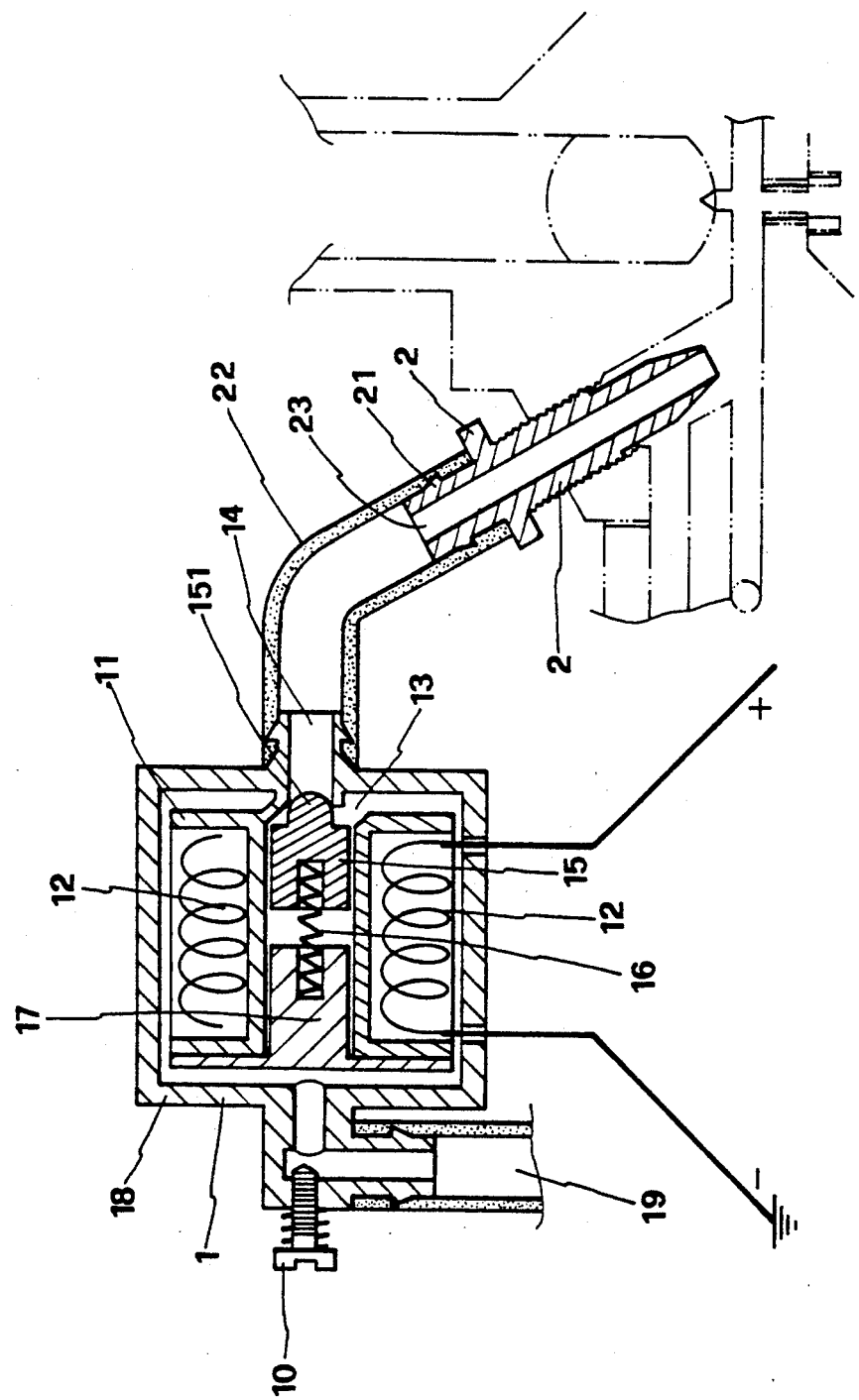
FIG. 3 is a sectional assembly view depicting a preferred embodiment of the air-fuel ratio control device of the present invention when installed (before operation)

Referring to FIGS. 2 and 3, the hollow screw member 2 has one end formed into a connector 21 which is connected to the air outlet hole 14 of the electromagnetic valve 1 by an air pipe 22, and an air passage 23 through the longitudinal axis thereof for guiding flow of air from the air outlet hole 14 into a motor vehicle's fuel pipe (shown schematically in FIG. 3) for mixing with fuel.

Referring to FIG. 3 again, before starting the vehicle's engine, the generator is not in operation, and the valve 15 is forced by the spring 16 to seal the air outlet hole 14. The original air-fuel ratio of the motor vehicle remains unchanged; and therefore the engine can be easily started.

Figure 4:
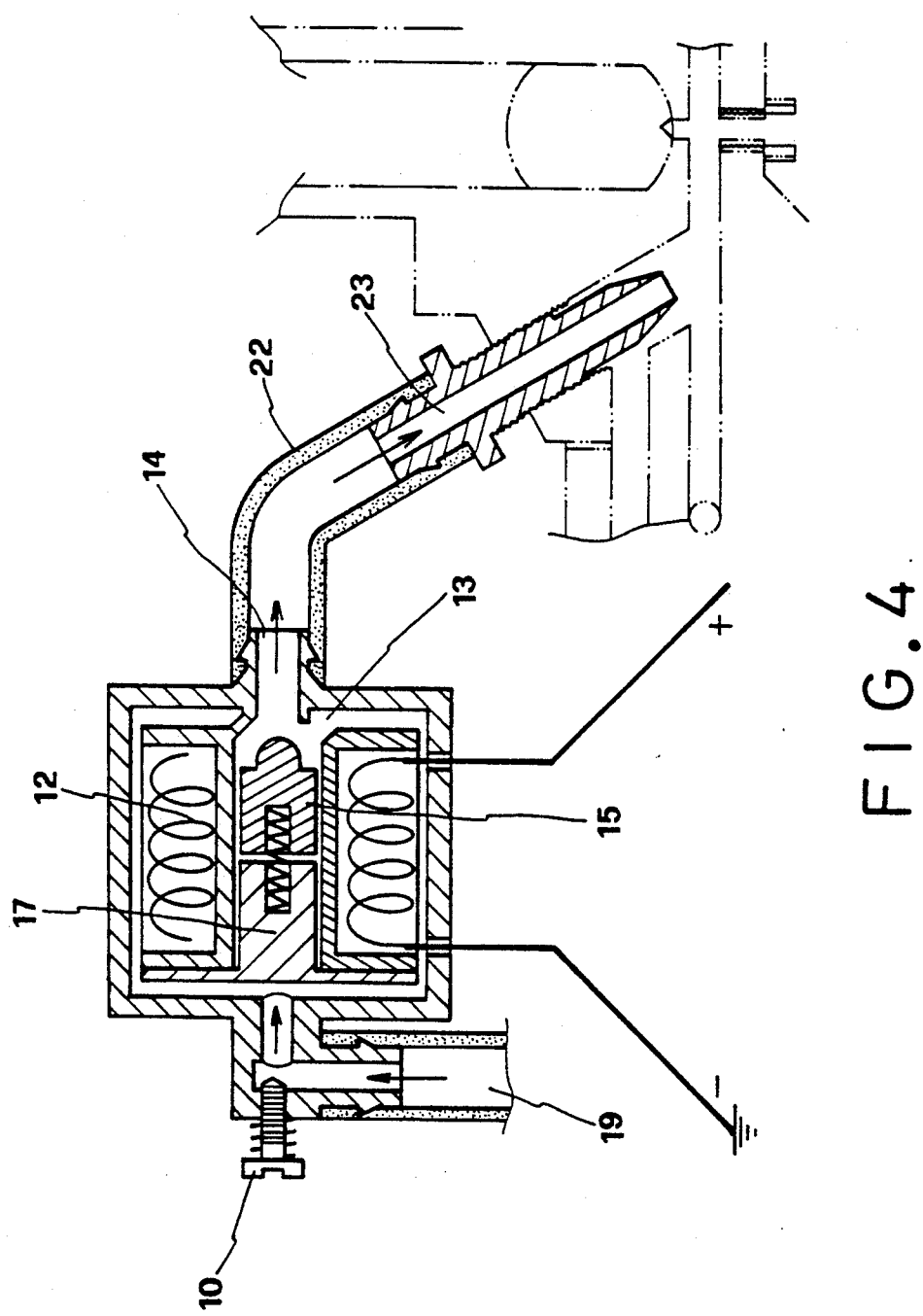
FIG. 4 is another sectional view of the preferred embodiment of the air-fuel ratio control device of the present invention when in operation.

Referring to FIG. 4, after the engine has been started, electric current is sent from the generator to coil 12 of the electromagnetic valve 1 causing it to be energized. When electrically connected, the coil 12 is triggered to produce a magnetic force causing the valve 15 to be attracted by the axle 17, and therefore the air outlet hole 14 is opened. Once the air outlet hole 14 is opened, intake air from the air intake port 19 is allowed to pass through the air passage hole 13, the air outlet hole 14, the air pipe 22 and the air passage 23 into the fuel pipe of the motor vehicle to mix with fuel. By means of adjusting the adjusting screw 10, the added volume of air can be regulated. By increasing the proportion of air in the air-fuel ratio, pollutants in exhausted air of the motor vehicle can be relatively reduced. Once the engine has been stopped, the valve 15 is moved back by the spring 16 to block up the air outlet hole 14, and therefore the proportion of air in the air-fuel ratio is reduced to enable a subsequent easy starting of the engine.

As indicated, the present invention provides a motor vehicle air-fuel ratio automatic control device which automatically regulates the proportion of air in the air-fuel ratio after each start or stop of the engine so as to reduce exhaust pollutants of a motor vehicle.

It is to be understood that the present invention is not limited to the embodiment shown by way of example and that deviations from this embodiment are possible within the scope of the invention.

What is claimed is:

1. A motor vehicle air-fuel ratio automatic control device comprising:

an electromagnetic valve enclosed by an outer shell having an air intake port and an air outlet hole, said electromagnetic valve including a coil holder housing a coil, an air passage hole interconnecting said air intake port with said air outlet hole, a valve member located between said air passage hole and one of said air intake port and said air outlet hole, an axle spaced from said valve member, and a spring supported between said valve member and said axle, said coil having one end adapted to be connected to an engine driven generator of a motor vehicle and an opposite end adapted to be grounded, said valve member being normally biased by said spring to block said air outlet hole to prevent fluid communication between said air intake port and said air outlet port;

a hollow screw member comprising an air passage through the longitudinal axis thereof, said hollow screw member having one end fluidly connected to said air outlet hole of said electromagnetic valve and an opposite end adapted to be connected to a fuel pipe of a motor vehicle; and wherein electrically energizing said coil causes said valve member to be attracted by said axle so as to shift said valve member against the biasing force of said spring and permit said air outlet hole to be in open fluid communication with said air intake port for delivering a current of air into the fuel pipe; electrically de-energizing said coil causes said valve member to be shifted back by the biasing force of said spring to again block said air outlet hole.

2. The motor vehicle air-fuel ratio automatic control device according to claim 1, further including an adjusting screw at said air intake port to regulate the volume of intake air into said air passage hole.

* * * * *